United States Patent
Boross et al.

(10) Patent No.: US 10,524,225 B1
(45) Date of Patent: Dec. 31, 2019

(54) SYSTEM AND METHOD FOR LOCATING A MOBILE ELECTRONIC DEVICE

(71) Applicant: A9.com, Inc., Seattle, WA (US)

(72) Inventors: Christopher Boross, San Francisco, CA (US); Paul Nangeroni, San Francisco, CA (US)

(73) Assignee: A9.com, Inc., Seattle, WA (US)

( * ) Notice: Subject to any disclaimer, the term of this patent is extended or adjusted under 35 U.S.C. 154(b) by 0 days.

(21) Appl. No.: 15/671,484

(22) Filed: Aug. 8, 2017

Related U.S. Application Data

(60) Provisional application No. 62/372,159, filed on Aug. 8, 2016.

(51) Int. Cl.
| | | |
|---|---|---|
| *H04W 24/00* | (2009.01) | |
| *H04W 64/00* | (2009.01) | |
| *G01S 5/02* | (2010.01) | |

(52) U.S. Cl.
CPC ......... *H04W 64/003* (2013.01); *G01S 5/0284* (2013.01)

(58) Field of Classification Search
CPC . G01S 5/02; G01S 5/0252; G01S 5/14; G01S 19/14; H04L 29/08657; H04L 29/08108; H04L 29/08936; H04L 12/282; H04L 2012/2841; H04L 67/06; H04W 4/02; H04W 64/00; H04W 48/04; H04W 4/22; H04W 76/007; H04W 76/04; H04W 76/048; H04W 88/06; H04M 1/72572; H04M 1/72577; G01C 21/20; G06Q 30/02

USPC ............. 455/456.1–457; 370/254, 328, 338; 342/450

See application file for complete search history.

(56) References Cited

U.S. PATENT DOCUMENTS

| | | | |
|---|---|---|---|
| 8,971,913 B2 * | 3/2015 | Moeglein | G01S 5/0036 455/456.1 |
| 9,648,550 B2 * | 5/2017 | Zhao | H04W 48/18 |
| 2004/0203748 A1 * | 10/2004 | Kappes | H04L 12/2856 455/432.1 |
| 2005/0105496 A1 | 5/2005 | Ambrosino | |
| 2005/0282556 A1 | 12/2005 | Morris | |
| 2010/0110948 A1 * | 5/2010 | Batta | G01S 5/06 370/311 |
| 2010/0238862 A1 * | 9/2010 | Davidson | G01S 5/0252 370/328 |

(Continued)

*Primary Examiner* — Khoi H Tran
*Assistant Examiner* — B M M Hannan
(74) *Attorney, Agent, or Firm* — Lowenstein Sandler LLP

(57) ABSTRACT

A method for locating a device, including: at a first and second router, collecting sets of LAN communication data; based on the sets, determining location types of the routers; at the first router, receiving a wireless transmission from the device; based on the wireless transmission, determining a location of the device; and controlling a set of electronic devices based on the location and the first location type. A method for locating an device, including: at a first router: establishing a wireless connection to the device; receiving a first wireless transmission from the device; and disconnecting from the device; receiving a second wireless transmission from the device at a second router; based on the first and second wireless transmissions, determining connection metrics; based on the connection metrics, determining a location of the device; and controlling a set of electronic devices based on the location.

19 Claims, 11 Drawing Sheets

(56) References Cited

U.S. PATENT DOCUMENTS

| | | | |
|---|---|---|---|
| 2012/0115508 A1* | 5/2012 | Moeglein | G01S 5/0036 455/456.1 |
| 2012/0309408 A1* | 12/2012 | Marti | G01S 5/0027 455/456.1 |
| 2012/0309410 A1* | 12/2012 | Marti | H04W 64/006 455/456.1 |
| 2012/0329484 A1* | 12/2012 | Rothschild | G01S 5/0242 455/456.5 |
| 2013/0308618 A1* | 11/2013 | Panneerselvam | G01S 5/0236 370/338 |
| 2014/0064126 A1* | 3/2014 | Lim | H04W 24/00 370/252 |
| 2014/0329537 A1* | 11/2014 | Huang | H04W 64/003 455/456.1 |
| 2015/0063169 A1 | 3/2015 | Lu | |
| 2015/0264536 A1* | 9/2015 | Patil | H04W 4/043 455/456.1 |
| 2016/0165405 A1* | 6/2016 | Shinozuka | H04W 4/04 455/456.1 |
| 2016/0165570 A1* | 6/2016 | Kim | H04W 4/023 455/456.2 |
| 2017/0245198 A1* | 8/2017 | Kim | H04W 64/006 |

* cited by examiner

SYSTEM AND METHOD FOR LOCATING A MOBILE ELECTRONIC DEVICE

CROSS-REFERENCE TO RELATED APPLICATIONS

This application claims the benefit of U.S. Provisional Application Ser. No. 62/372,159, filed on 8 Aug. 2016, which is incorporated in its entirety by this reference.

TECHNICAL FIELD

This invention relates generally to the computer networking field, and more specifically to new and useful systems and methods for locating a mobile electronic device.

BACKGROUND

The increased availability of mobile electronic devices has been in many ways a great boon. In today's world, people can consume or produce content, individually or together, in a variety of contexts thanks to the myriad tablets, smartphones, laptops, smart watches, and other devices currently on the market.

Unfortunately, the proliferation of these devices (and their ever-shrinking size) has made it difficult to keep track of all of the devices in an environment. Thus, there is a need in the computer networking field to create new and useful systems and methods for locating a mobile electronic device.

DESCRIPTION OF THE PREFERRED EMBODIMENTS

Figure 1:
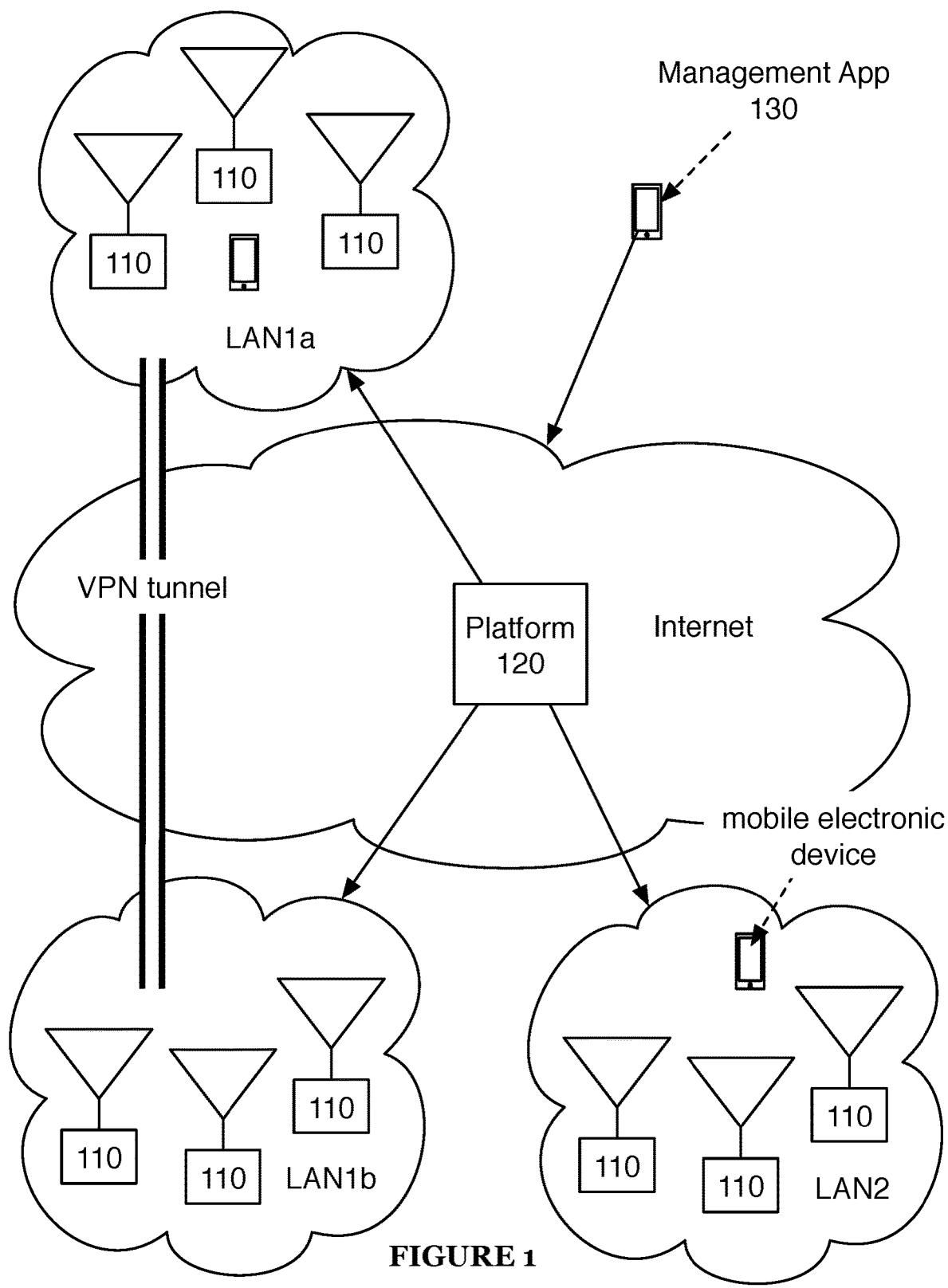
FIG. 1 is a diagram representation of a system of an invention embodiment.

The following description of the preferred embodiments of the invention is not intended to limit the invention to these preferred embodiments, but rather to enable any person skilled in the art to make and use this invention.

1. Locating Mobile Electronic Devices.

As described in the background section, keeping track of the mobile electronic devices in an environment is a serious issue. This issue is at the very best a substantial inconvenience and at worst a serious security risk (devices may be left unsupervised in locations where they may be accessed by unauthorized parties).

This issue is one the market has attempted to address, but the existing solutions are woefully inadequate to address the problem. For example, the most common technique for item location involves Bluetooth Low Energy (BLE) beacon tags with speakers. One could use such a tag either by physically affixing it to the electronic device and pairing it with another electronic device (in this case, the other device could be used to 'ring' the tag, causing a person to hopefully hear and locate the device the tag is affixed to) or by maintaining possession of the tag and actuating a button on it to 'ring' the electronic device paired to the tag.

There are an number of issues with this solution—one must maintain possession either of a specific locating electronic device (i.e., the one paired with the tag over Bluetooth) or a locating tag; the locating technique only works when the devices are turned on and coupled over Bluetooth (confining range to about 100 feet), and the locating technique only works when it possible to locate the tag simply using human hearing (difficult in loud environments or when the ringing device or tag is surrounded by sound insulating material).

Other techniques for device localization involve measuring, at the device for which localization is desired, the signal strength of wireless beacon signals broadcast by beacons (e.g., Bluetooth beacons, Wi-Fi access points) with known locations, and from the signal strength measurements and the device locations, determining the location of the device. These techniques are useful for locating, for instance, a person walking through a store using an indoor locating app on their smartphone. However, these techniques require that the signal data be captured at the device to be located (meaning it must be on and actively scanning for beacons), which limits the applicability of these techniques to a subset of devices capable of operating an application to capture and process signal data for locating purposes. These techniques also require that the location data be either viewed on the device for which localization is desired (impossible if the device is lost) or that the device must have an active network connection capable of providing the location information to another device.

The systems and methods of the present application are directed to locating mobile electronic devices in a manner that overcomes the substantial limitations of past solutions through utilization of a new centrally-managed mesh networking solution, such as the mesh networking system of U.S. patent application Ser. No. 15/008,251, the entirety of which is incorporated by this reference.

2. System for Locating a Mobile Electronic Device.

A system 100 for locating a mobile electronic device preferably includes a plurality of network devices 110 (e.g., wireless access points (APs) such as mesh network capable routers). The system 100 can additionally or alternatively include a router management platform 120, management application 130, and/or any other suitable elements (e.g., as shown in FIG. 1).

Figure 2:
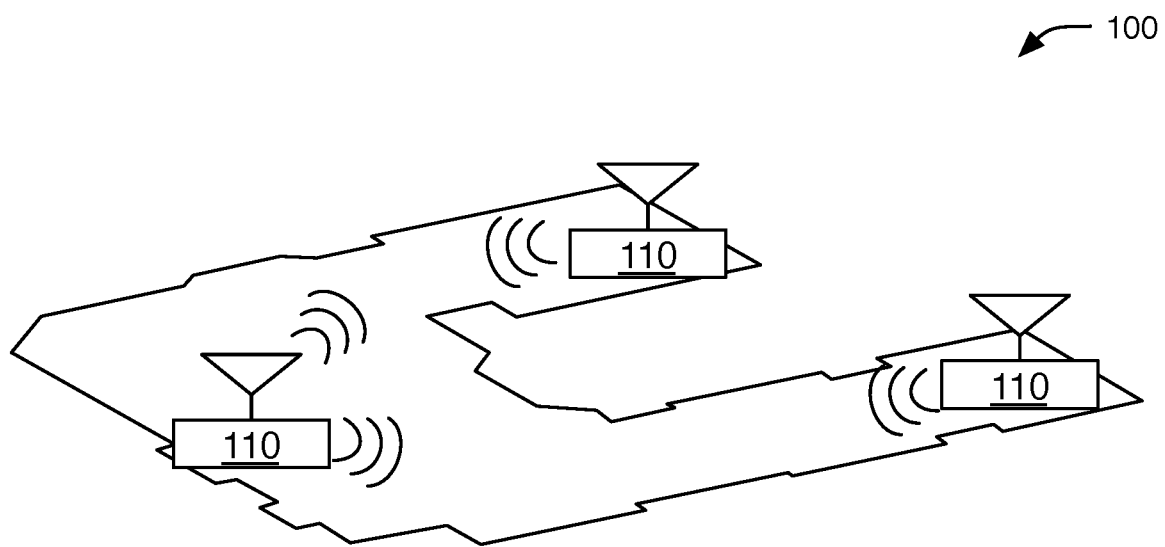
FIG. 2 is a diagram representation of a mesh network using smart routers of a system of an invention embodiment.

The system 100 preferably functions to enable seamless wireless coverage of an area (e.g., a user's home) using mesh networking while reducing the complexity of configuring such a network. Typically, to configure an internet-connected wireless mesh network, a user must configure a first router to serve as a gateway to the internet (e.g., by connecting the router to a cable modem). Further, some networking device (generally the aforementioned first router) must also be configured to serve as a network address translation (NAT) server, a dynamic host configuration protocol (DHCP) server, and a wireless access point. Then, to extend wireless coverage as shown in FIG. 2, additional devices (e.g., wireless routers, access points, repeaters) must be added. Even in the simple case of two or three wireless access points, the configuration options are virtually endless. For example, the access points could exist on a single bridged network, or could be separated into different networks (e.g., could be assigned to different VLANs; that is, virtual local area networks). The access points could be connected to each other by Ethernet cables, or simply serve as wireless repeaters. The access points could share available Wi-Fi channel space in any number of ways.

Even for experienced users, the array of network configurations available can be extremely overwhelming. The system 100 preferably performs much of this configuration both automatically and dynamically-optimizing the network for a user's needs without requiring extensive computer networking knowledge or hassle.

In addition to this task, the system 100 may be leveraged to locate mobile electronic devices within a network (or a set of networks) as described in the section on the method 200. Examples of mobile electronic devices may include smartphones, smart watches, wireless sensors, video game consoles, televisions, laptop computers, etc.

The mesh-network capable routers 110 are preferably substantially similar to those described in U.S. patent application Ser. No. 15/008,251, the entirety of which is incorporated by this reference. Additionally or alternatively, the routers 110 may be any suitable networking devices (e.g., smart access points).

Figure 3:
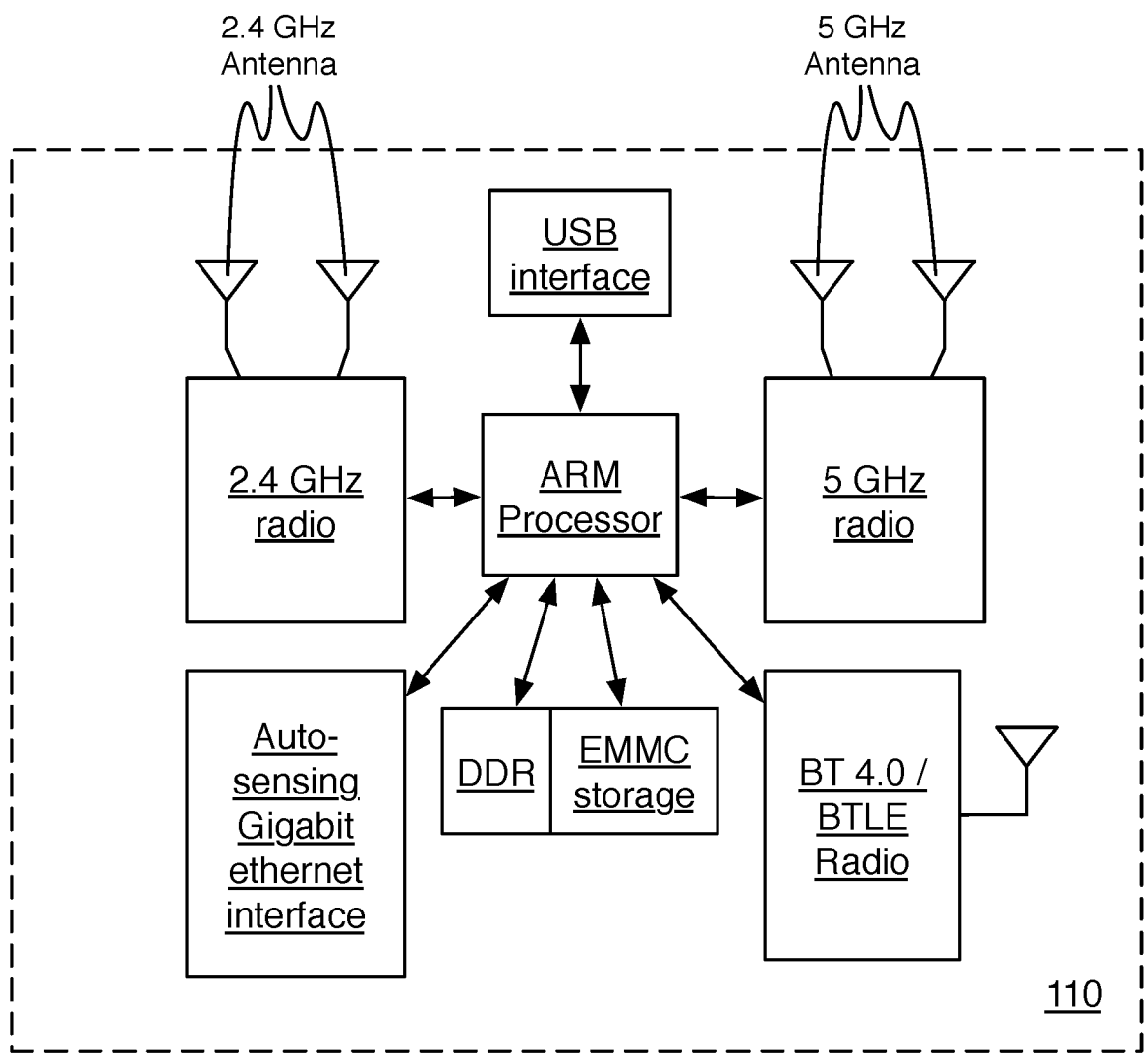
FIG. 3 is a diagram representation of a smart router of a system of an invention embodiment.

The routers 110 preferably include a Wi-Fi radio, a Bluetooth radio, an Ethernet interface, and a processor. The router may additionally or alternatively include any other hardware or software. In one example implementation, as shown in FIG. 3, a smart router includes two Wi-Fi radios: one 5 GHz radio, and one switchable radio (that may operate at either 5 or 2.4 GHz), a Bluetooth radio capable of Bluetooth Smart communication, an auto-sensing gigabit Ethernet interface, an ARM processor, DDR RAM, EMMC storage (for router firmware), and a USB interface (e.g., for adding network-accessible storage). In a second example implementation, a smart router includes three Wi-Fi radios: two 5 GHz radios and one 2.4 GHz radio, a Bluetooth radio capable of Bluetooth Smart communication, an auto-sensing gigabit Ethernet interface, an ARM processor, DDR RAM, and EMMC storage (for router firmware). In a third example implementation, a smart router includes two Wi-Fi radios: one 5 GHz radio and one 2.4 GHz radio, a Bluetooth radio capable of Bluetooth Smart communication, an ARM processor, DDR RAM, and EMMC storage (for router firmware).

The routers 110 are preferably configured and/or managed by the router management platform 120 (or any suitable remote management platform). The router management platform 120 is preferably a remote management platform (e.g., includes one or more remote servers outside the LAN of the routers 110, connected or connectable to the routers 110 by an internet connection, etc.). In one example, routers 110 may be configured by altering stored configuration profiles in a remote server (part of the router management platform 120), after which the stored configuration profiles are pushed to the routers 110. This technique is particularly useful in mesh networking applications; if the router management platform 120 is aware that three smart routers are intended for use in a single network, the router management platform 120 can attempt to bridge the networks of the three routers regardless of physical location or existing network topology.

The router management platform 120 may additionally function to manage connections and/or permissions associated with various networks. For example, a user of the router management platform 120 associated with one network may have guest permissions on another network (e.g., users of LAN1 may be granted permissions with respect to LAN2 via the platform). As another example, the router management platform 120 may be used for (or may otherwise facilitate) bridging two networks via a VPN tunnel (e.g., two physical networks LAN1a and LAN1b into a single logical network), as shown in FIG. 1.

The router management platform 120 may additionally or alternatively be used to collect connection data from the routers 110 and/or provide this data (or analysis of this data) to users either via the routers 110 or otherwise (e.g., via a web portal).

The system 100 may additionally include a management application 130 that functions to manage routers 110 that are part of a network. The management application 130 is preferably a native application running on a smartphone (e.g., an iOS or Android application), but may additionally or alternatively be any suitable application (e.g., a web app, a desktop app, etc.). The management application 130 may be used to perform or aid in router 110 configuration, but may also be used to collect data used by the method 200. For example, a management application operable on a device for which location data is desired may collect (and potentially analyzed and/or transmit) data that may be used to perform device localization.

3. Method for Locating a Mobile Electronic Device.

Figure 4:
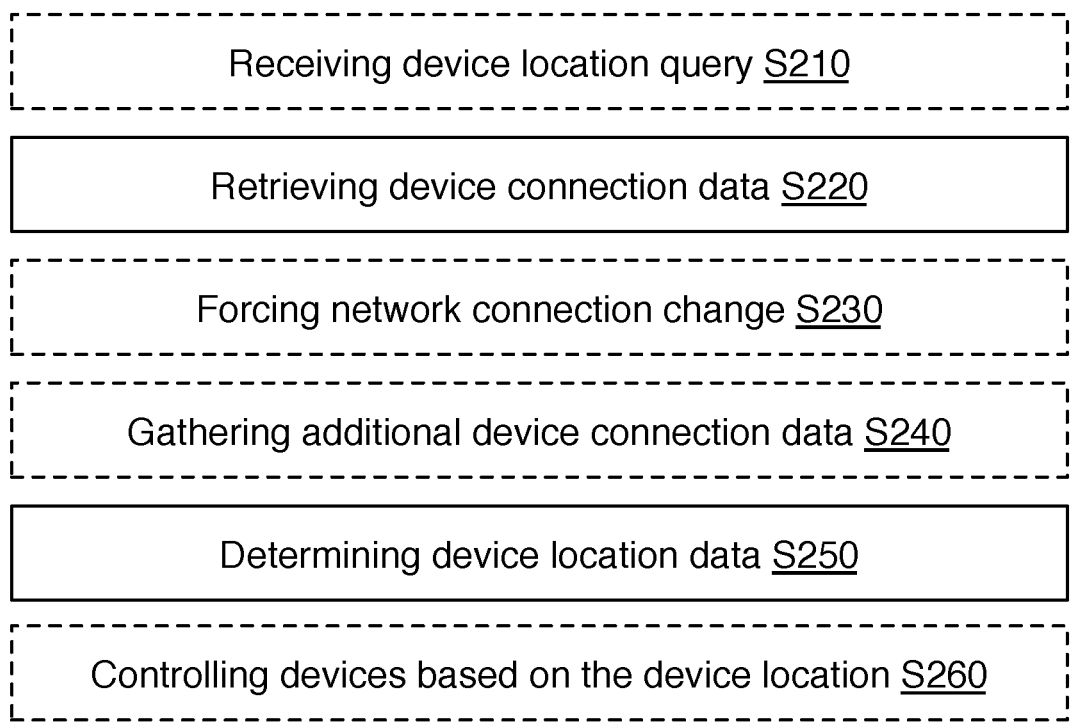
FIG. 4 is a chart representation of a method of an invention embodiment.

A method 200 for locating a mobile electronic device preferably includes retrieving device connection data S220, and determining device location S250 as shown in FIG. 4. The method 200 may additionally or alternatively include receiving a device location query S210, forcing a network connection change S230, gathering additional device connection data S240, and/or controlling devices based on the device location S260.

The method 200 functions to enable a mobile electronic device to be located using data collected by mesh-networked wireless access points (e.g., the routers 110). The method 200 preferably includes receiving (at an access point or a management platform of a network) a request for the location of a mobile electronic device (S210). Based on historical device connection data collected by the access points (retrieved in S220) and some knowledge of access point location, a location of the device can be determined (S250). The method 200 may additionally utilize special features enabled by control of the mesh-network access points to aid in performing location; for instance, the method 200 may include forcing a network connection change (S230) to enable the collection of additional data (S240). Additionally or alternatively, the method 200 may utilize out-of-channel data collection techniques (another example of S240) if enabled by router hardware; for example, some routers (e.g., the router 110) may contain Bluetooth radios, enabling data collection over Bluetooth in addition to over Wi-Fi.

In addition to enabling lost devices to be found, the method 200 may enable the modification of network policies or parameters based on device location. For instance, a parent may restrict a child's internet usage when the child is not in a specific region (e.g., in the living room) or near another device (e.g., the parent's smartphone, as a proxy for the position of the parent). Additionally or alternatively, the method 200 may be used for authentication purposes; for example, network configuration changes may only be accepted from devices localized within a particular area (e.g., inside the home for which the network has been established).

The method 200 is preferably implemented by the system 100, but may additionally or alternatively be implemented by any suitable system (e.g., mesh networking system) capable of performing the functions of the method 200.

S210 includes receiving a device location query. S210 functions to receive a request to locate a mobile electronic device or a set of mobile electronic devices.

The device location query received in S210 preferably specifies identifiers (e.g., name, MAC address, IP address) for the devices for which localization is desired. As an alternative to specifying device identifiers, the device location may specify conditions for devices to be located (e.g., instead of requesting the location of "Tom's iPhone", the request may request the locations of all Amazon Kindles within a house, or the location of the most recently used laptop computer within the house). The device location query may additionally or alternatively include any other data. For example, the device location query may include authorization and/or authentication data (e.g., verifying that the requestor is authorized to obtain device location information).

Note that the correspondence between identifiers (e.g., device name) and how devices are searched for (e.g., by MAC address) is preferably set based on a list of user-supplied links (e.g., the user names devices), but may additionally or alternatively be set in any manner (e.g., by the DHCP or mDNS hostname broadcast by the device, or the type or quantity of data broadcast).

The device location query is preferably eventually received (not necessarily in original form) at a computing device capable of accessing historical connection data. For example, S210 may include receiving a device location query locally at a router (e.g., over Wi-Fi or Bluetooth) and requesting historical connection data, at the router, from a connection log shared by the network of the router. As a second example, S210 may include receiving a device location query over the internet at a router management platform and querying historical connection data of a particular network stored remotely (e.g., at the router management platform). This example is particularly interesting because it enables a last known location (and time of last known location) for a device to be found even if the entire network used for location is offline (or if the device itself is not connected). This can aid in narrowing search area. S210 may additionally or alternatively include transforming and/or forwarding device location queries. For example, S210 may include receiving a device location query at a router and forwarding the query (in original or in transformed form) to a router management platform (or vice versa). S210 may include transforming device location queries in any manner (e.g., removing information, adding information, translating device names to MAC addresses, etc.).

As previously discussed, S210 may include receiving authentication or authorization data. This data (or other identity data) may also be used to identify networks (or historical network connection datasets corresponding to networks) to be searched for historical connection information. For example, if a user requests location of a Kindle from a laptop, the user may initiate this request from a web portal corresponding to the router management platform (while authenticated with the platform). Based on the user's identity, the set of networks associated with the user can be queried for historical connection data (alternatively, if stored remotely, the datasets associated with those networks can be queried without querying the networks themselves). Additionally or alternatively, publicly accessible networks may be queried for historical connection data related to the user. S210 may additionally or alternatively include requesting authentication and/or authorization data (e.g., if not already received as part of the device location query).

The method 200 may include controlling or modifying the device localization process (or the output of such a process) based on the permissions afforded to a particular user or device. For example, a user may receive the most detailed location information possible for a network the user owns or administrates, but may receive only less-detailed location information for other networks (or no location information at all).

The method 200 may also include controlling or modifying the device localization process based on the origination point of the request (or any other property of the request). For example, in-network requests (i.e., requests made from a device operating on the network over which localization is desired) may be treated differently from out-of-network requests.

The flexibility of S210 enables device location queries to originate from a variety of sources. For example, the request of S210 may originate from a voice-controlled assistant (e.g., Amazon Echo)—a user may say "Alexa, please locate Paul's iPhone"; the assistant may then forward this request to an access point (or to a router management platform) to perform the locating task (e.g., via an API), and the location may be returned to the voice-controlled assistant: "User, Paul's iPhone was last seen near the bedroom access point ten minutes ago".

Figure 7:
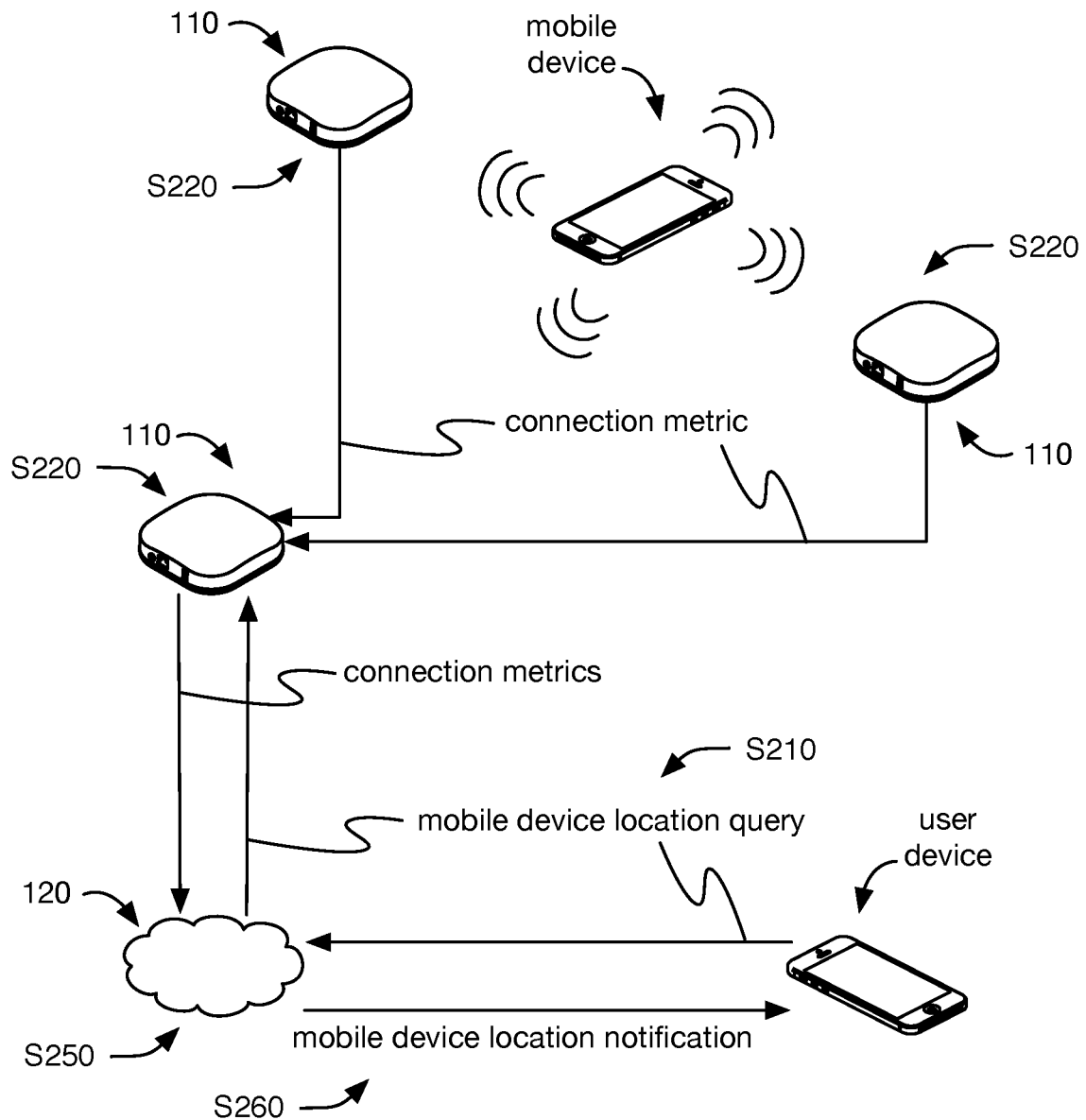
FIG. 7 is a schematic representation of a first example of the method.
Figure 8:
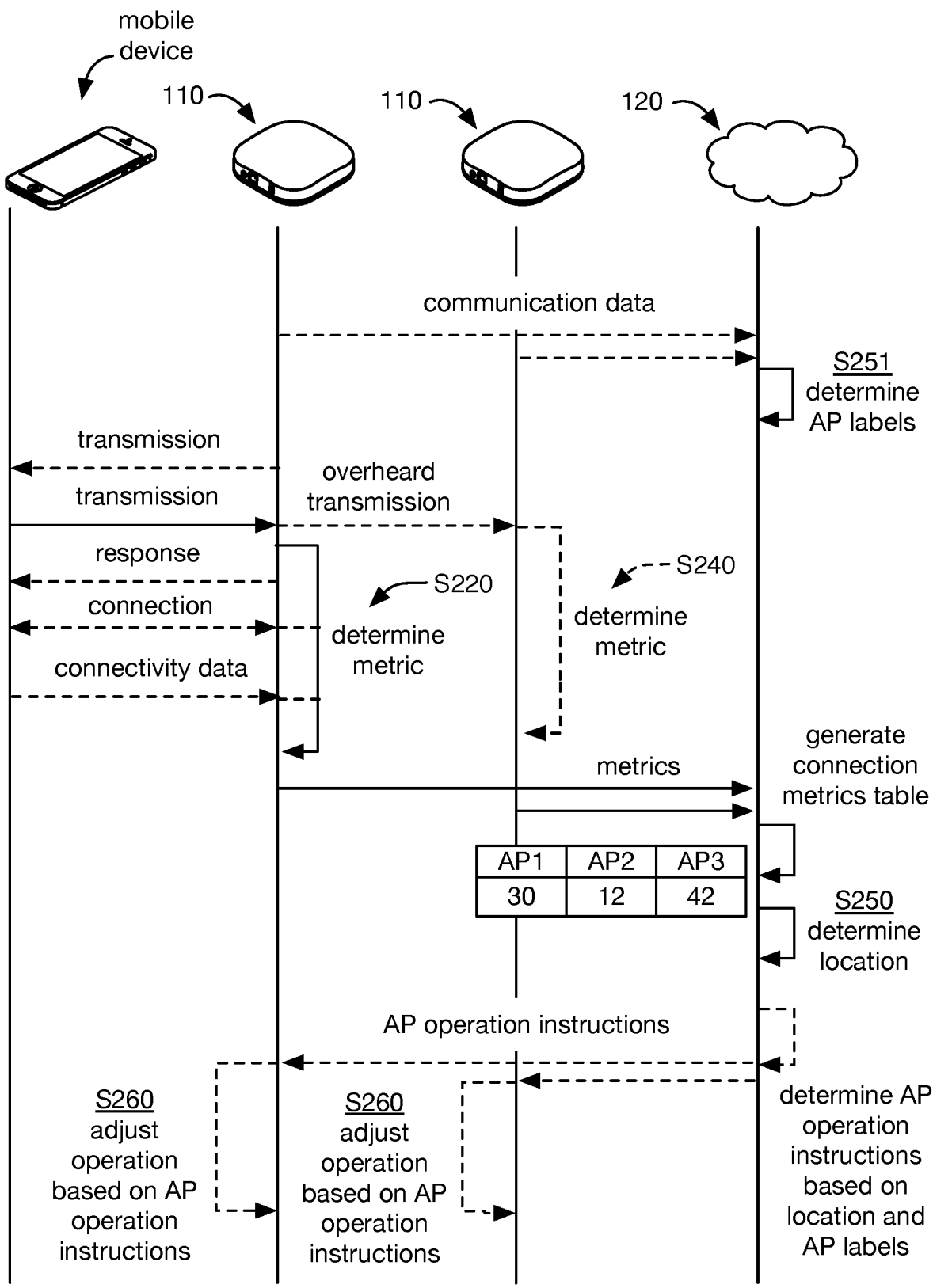
FIG. 8 is a schematic representation of a second example of the method.

S220 includes retrieving device connection data (e.g., as shown in FIGS. 7 and 8). S220 functions to retrieve data related to the network connection(s) between the device (for which location information is desired) and the network or networks the device uses for network (and/or internet connectivity).

Device connection data may include any data relating to a device's network connection. For example, device connection data may include time of last communication with an access point (AP), connection metrics (e.g., metrics associated with wireless transmissions from and/or to the device, such as received signal strength indicators (RSSI), received channel power indicators (RCPI), and/or other power level metrics, modulation and coding schemes (MCS), angle of arrival (AoA), location patterning, latency data, signal strength data, error rate data, connection type data, connection rate data, etc.), and/or any other suitable connection data. Device connection data may be as observed by the device or by any other device on the network (e.g., signal strength of the AP as seen by the device may be measured at the device, while signal strength of the device as seen by the AP may be measured at the AP). The device connection data can be associated with one or more APs. For example, the device connection data can include an RSSI and/or AoA for a client device at each of a plurality of APs. The device connection data can be determined (e.g., at an AP) based on received transmissions directed to the AP (e.g., probe requests, data frames, etc.), 'overheard' transmissions (e.g., directed to another AP, such as a unicast transmission to the other AP), and/or any other suitable information.

Device connection data may additionally or alternatively include data relating to any connections (or other potential communication) between the device and an access point. For example, if an access point has both Wi-Fi and Bluetooth radios, connection data may include any data relating to communication between the device and either or both of these radios. Further, device connection data may include any communication data (even data collected without an explicit connection between device and AP). For example, device connection data may include connection metrics such as the signal strength (e.g., RSSI) of AP beacons as measured at the device and/or of device wireless transmissions as measured at the APs (even though the device may not explicitly connect to any of these APs).

Device connection data may be retrieved from any suitable source. For example, device connection data may be retrieved from local logs stored at an access point. As a second example, device connection data may be retrieved from distributed logs shared by access points (e.g., the access points of a mesh network). As a third example, device connection data may be retrieved from a router management platform (which may source the data from a database at the router management platform, may source the data from specific access points, and/or may source the data from any other data storage). As a fourth example, device connection data may be received from the device itself (e.g., if the device is currently reachable over the network).

Device connection data is preferably historical data; that is, data stored in logs or other databases as a result of prior communication activity on the part of the device. The use of historical device connection data enables the method 200 to perform device location even if the device is not turned on (or is otherwise unable to be reached by the system operating the method 200). Additionally or alternatively, S220 may include retrieving current device connection data (e.g., by requesting the status of an existing connection between an AP and the device, either at the AP or the device). In this example, S220 may include sending an active data request (e.g., a request for signal strength information, a ping command).

As discussed in previous sections, connection data may be stored at the device, APs or routers on the local network, and/or the router management platform. In some cases, different aspects or versions of connection data may be stored in different locations. For example, the router management platform may maintain a 'last network' entry that, for a given device, describes the last network the device was connected to (in this example, a device location query may initially query the router management platform, which in turn either directs a user to the 'last network' or retrieves additional data from the 'last network' automatically).

Note that the ability to query the router management platform may enable the method 200 to locate a device that may be on any of a number of networks without explicitly and manually querying each network. For example, the router management platform may search device connection data corresponding to multiple networks.

The availability and/or detail of device connection data retrieved in S220 may in some cases depend on the permissions (or otherwise on the identity or classification) of the user and/or device requesting device location. For example, S220 may include receiving full connection data for networks owned and/or administrated by a user (e.g., "device last seen at 'bedroom' AP on 'Paul's Home Network', estimated loft away based on RSSI", "device last seen at 'conference room' AP on 'Paul's Office Network'), but may receive only partial connection data (or no data) for networks for which a user may have lower permissions (e.g., "device last seen on 'Jerry's network, further details available upon authorization by Jerry", or "device last seen on a foreign network, would you like to contact the network administrator?"). Alternatively, the full data may be received by the remote management platform, but the full level of analysis (as reflected above) may be modified based on user permissions.

Device connection data is preferably retrieved based on device MAC address, but may additionally or alternatively be retrieved based on any suitable device identifier (or other piece of data).

S230 includes forcing a network connection change. S230 functions to force the device for which location data is desired to change one or more network connection states (e.g., which access point the device connects to over Wi-Fi).

S230 is preferably used in cases where the device is known (or assumed) to have an active connection with a network. As discussed in more detail in the sections on S250, forcing a network connection change may enable additional connection data to be collected (e.g., in S240), which in turn may enable more accurate localization of the device. For example, S230 can be used in response to receiving a device location query S210 and subsequently receiving a wireless transmission from the device at a first AP (e.g., an AP to which the device is connected) but not at a second AP. In this example, performing S230 may cause the device to send additional wireless transmissions (e.g., to attempt to reconnect to the first AP and/or connect to another AP, such as the second AP) that the second AP may be able to receive (e.g., enabling collection of connection data at the second AP). In a specific example, the device transmits to the first AP at a reduced power (e.g., such that the second AP does not reliably receive the device transmissions), but in response to being disconnected from the first AP, the device transmits at an increased power (e.g., maximum power; sufficient power that the second AP receives the transmissions) while attempting to connect to another AP.

The network connection for which a change occurs is preferably a Wi-Fi connection, but may additionally or alternatively be any wireless connection (e.g., Bluetooth).

For example, S230 may be used to enable collection of connection data from multiple access points with different locations, enabling more accurate localization (e.g., data from two access points could be used to localize the device to one of two positions in a two-dimensional plane or to a circle in a three-dimensional space, such as by a bilateration process; data from three access points could be used to localize the device to a single position in a two-dimensional plane, such as by a trilateration process).

Alternatively, S230 may be used to aid in finding a closest access point to the device (which may be helpful for performing localization). This is significant because, as discussed below, devices are not always connected to the closest access point, even if that closest access point has the highest signal strength as seen by the device.

Note that the reason for forcing a connection change is in part dependent on the manner in which the device roams between wireless networks. For many mobile electronic devices (e.g., most smartphones), device users (and APs, for that matter) have very little control over how the device chooses a wireless network. In most cases, wireless clients connect to a network and remain connected to it until signal quality (or another metric of communication quality) drops below a static threshold, at which point the clients disconnect and search for the strongest signal. In networks having APs with overlapping wireless ranges (especially dense mesh networks), this means that frequently a client initially connected to AP1 may move closer to AP2 than AP1, but will still remain connected to AP1 (because AP1 signal hasn't dropped below a threshold).

Forcing a client disconnect preferably causes such a device to re-check what the strongest AP is and connect to it. Note that while AP signal strength is correlated with distance from the AP, interference and noise may mean that the strongest AP is not necessarily the closest. For example, a smartphone is in a living room near a wall, and the living room AP is ten feet away. A bedroom, having a bedroom AP, is on the other side of the wall. In such a situation (based in part on attenuation due to the wall), the smartphone may see the living room AP as "closer" (i.e., it sees a higher signal strength). Forcing a client connection change may have numerous changes beyond localization, including optimization of mesh networking parameters, network load balancing, and/or wireless interference management.

S230 may include forcing a client connection change in any manner. In a first example, S230 includes removing a client from an access point by blocking the MAC address (or another identifier) of the client at the access point (e.g., not responding to and/or ignoring transmissions from the client to the access point; transmissions to ignore can include association requests, authentication requests, all client transmissions, etc.) and actively kicking the client off of the access point (e.g., by transmitting deauthentication and/or disassociation frames to the client); this prevents the client from reconnecting until the MAC address is unblocked. In some variations, the client is allowed to reconnect (e.g., the MAC address is unblocked) in response to client connection to a different AP and/or collection of additional connection data at another AP. However, reconnection can additionally or alternatively be allowed at any other suitable time (or can not be allowed at any time). Alternatively, S230 may include disconnecting a client from an AP without preventing the client from rejoining that AP.

In a second example, S230 includes rescinding credentials for a particular device. In the second example, S230 may include rescinding credentials in any manner; for example, by rescinding access to an AP using a set of credentials associated with the device or with a user of the device. In some cases, these credentials may be device or user specific (e.g., a certificate stored on a smartphone, a username/password) but additionally or alternatively, the credentials may be non-device-specific (e.g., an AP password for a WPA-2 personal secured AP).

S230 may additionally or alternatively include disconnecting a client from an AP in any other manner (e.g., by lowering transmit power of the AP to force client roaming).

Note that S230 may, by controlling the access points a client can connect to, force a client to connect to a specific AP (or one of a set of APs). For example, a mesh network may include four APs within range of a device: AP1, AP2, AP3, and AP4. By blocking the device from connecting to AP1 and AP2, the network may force the device to connect to one of AP3 or AP4. Likewise, AP3 could also be blocked to force the device to connect to AP4.

The preceding examples are operable even when APs have limited control over client roaming. However, in some cases, a network may have more substantial control over client roaming (or may even be able to designate which network the device connects to explicitly). In these cases, S230 may additionally or alternatively include modifying client roaming parameters and/or directing the device to connect to a specific AP or a set of APs.

S240 includes gathering additional device connection data. S240 functions to collect device connection data in addition to the data collected in S220. S240 is preferably performed to collect connection data on a different connection that the one for which connection data is retrieved in S220 (e.g., Bluetooth instead of Wi-Fi, or a second Wi-Fi connection instead of a first Wi-Fi connection). For example, S240 may be performed after a forced connection change to acquire data from a connection with another AP. Additionally or alternatively, S240 may be performed to collect additional connection data for any purpose. For example, S220 may include retrieving historical data on a device's network connection, and S240 may include retrieving current data (if the device is addressable).

Data collection in S240 may be directed by the results of data collection in S220. For example, S220 may include retrieving historical data for a device connection and from that data determining that a device was last connected to AP4 of Network 1. Then, S240 may include querying AP4 of Network 1 directly to see if the device is still available.

In a first example, S240 includes collecting connection data after a connection change forced in S230. The type of data collected in this example may be substantially similar to the data collected prior to the connection change (e.g., connection RSSI).

In a second example, S240 includes collecting Bluetooth connection data. In this example, S240 may collect Bluetooth data at an AP by scanning for Bluetooth devices. Note that this scan may be capable of detecting discoverable devices (many devices may not necessarily always be discoverable). Alternatively, S240 may collect Bluetooth data at an AP by attempting to connect to a specific device (or set of specific devices) for which a previous Bluetooth connection has been established. This may be advantageous to locate devices for which Bluetooth discovery is not enabled.

In a third example, S240 may include collecting data from the device (if the device is in communication with the network). For example, S240 may include requesting that a device perform a scan of nearby APs and return signal strength data for all nearby APs. In addition to connection data, S240 may include collecting additional data from the device (e.g., GPS data, accelerometer data, camera data, microphone data).

S250 includes determining device location. S250 functions to estimate a device's location based on the data received in S220 (and potentially in S240).

In a first implementation of an invention embodiment, S250 includes determining (based on data collected in S220/S240) the last AP in a network or set of networks that the device was connected to, and reporting this last known connection, along with an identifier of the AP, as a reference point for determining the location of the device. For example, a home may include three routers labeled 'Bedroom 1', 'Bedroom 2', and 'Living Room'. Notifying a user that the device was last connected to the 'Bedroom 1' router may provide an indication to the user that device is in the vicinity of the 'Bedroom 1' router (which is near a first bedroom of the home).

S250 may additionally or alternatively include estimating a distance from this last known AP (i.e., the distance of the device from the AP during the last known communication) using connection data collected in S220/S240. For example, received signal strength indicator (RSSI) data may be used to estimate a distance from the AP. As another example, error rate may also be used to estimate a distance from the AP.

S250 preferably includes estimating distance of the device from an AP using signal strength measurements, but may additionally or alternatively include estimating distance in any manner (e.g., by error rate between device and AP, by latency between device and AP, using GPS and/or accelerometer data).

S250 may additionally or alternatively include calibrating distance estimates based on data received in S220/S240. For example, the highest RSSI of an AP ever seen by a device (or all devices on a network) may be calibrated to a distance of 0 m from the AP.

While the first implementation describes techniques for finding the distance between the device and AP, S250 may additionally or alternatively include providing more precise localization data by determining the distance to multiple APs. For example, if the relative locations of access points (i.e., relative to each other) are known, trilateration may be used to determine the location of the device relative to the access points. S250 may include performing any localization technique that utilizes estimated distances and/or angles of the device to APs (e.g., bilateration, triangulation, multilateration, etc.) to produce a location of the device relative to the APs.

S250 may additionally or alternatively include determining an absolute position (e.g., geographical position) of the device. For example, an absolute device position can be determined based on an absolute AP position and a relative location of the device with respect to the AP.

S250 may additionally or alternatively include determining the heading of the device (and/or of a user carrying the device) using data collected in S220/S240 (e.g., device connection metrics, radar data such as Wi-Fi channel state information, etc.), preferably a time series of data. For example, S250 may include determining that a device's three last known RSSI measurements were similar (and from this determining that the device was not moving when last seen). As a second example, S250 may include determining that a device was moving away or toward an AP when last seen (if RSSI decreased or increased respectively). Likewise, S250 may include determining heading with respect to multiple APs to provide more precise localization (e.g., the device was heading away from AP1 and toward AP2).

S250 can additionally or alternatively include determining (e.g., predicting) future device locations. Determining future device locations can include predicting future device locations and/or device paths based on historical behavior data (e.g., paths observed in previous cases under similar circumstances), declared intentions (e.g., received from a user, such as via the device), and/or based on any other suitable information.

As mentioned in previous sections, S250 preferably includes localizing the device relative to AP positions. S250 preferably additionally includes referencing AP positions to user reference positions.

S250 may reference AP position to reference positions in any manner. For example, a user may place APs and identify them (e.g., via a router management platform) with text labels corresponding to their location (such as the 'Bedroom 1' router mentioned previously). Additionally or alternatively, the method can include automatically labeling the APs S251 (e.g., by the router management platform, by the APs, by one or more user devices, etc.), which can function to reduce or eliminate the need for user input during AP labeling. Note that while APs may be identified by room or region labels, they are preferably also identified by their associated network (e.g., differentiating the 'Bedroom 1' router of Tom's network and the 'Bedroom 1' router of Keith's network). The APs can additionally or alternatively be identified by other information (e.g., location information such as geographic position, account information such as user and/or company identifiers, billing information, etc.) that can function to differentiate between APs, provide additional context about the APs, and/or otherwise facilitate elements of the method. Alternatively, APs may be identified in any manner.

The AP labels can be determined using heuristics, using machine learning and/or statistical techniques (e.g., classification, regression, clustering, etc.), based on user inputs (e.g., received from the RMP, a client device, another AP, etc.), and/or using any other suitable determination techniques.

Automatically labeling the APs preferably includes determining one or more physical location types associated with an AP. A physical location type preferably includes a type of room and/or area (e.g., kitchen, bedroom, living room, dining room, home theater, garage, backyard, park, office, etc.) that the AP is associated with (e.g., known or predicted to be: in, near, serving with Wi-Fi coverage, etc.). The physical location type can optionally include information associated with specific rooms (e.g., Jim's bedroom, ground floor entry, South-East room, etc.). However, the physical location type can additionally or alternatively include any other suitable location characteristics. Each AP is preferably labeled with a single physical location type, but can alternatively be labeled with multiple location types. For example, an AP that serves multiple rooms can be labeled with location types associated with each room (e.g., an AP arranged between an adjoining kitchen and living room labeled as both 'kitchen' and 'living room', or as 'kitchen+ living room').

S251 preferably includes determining the labels automatically based on characteristics of communication data (e.g., LAN communication data). LAN communication data can include data associated with intra-LAN communication, communication between the LAN and a WAN (e.g., the internet), transmissions from and/or to devices associated with the LAN (regardless of whether the transmissions are mediated by the LAN), and/or any other suitable communications associated with the LAN. The communication data is preferably collected (e.g., sampled, recorded, etc.) by the APs, but can additionally or alternatively be collected by other devices of the LAN (e.g., user devices), devices of other networks, the router management platform, and/or any other suitable devices. The communication data characteristics can include the type, timing, connection metrics, radio frequency, communication protocol, transmitter, intended recipient, content, and/or any other suitable characteristics of communications (e.g., radio transmissions). However, S251 can additionally or alternatively include automatically labeling the APs in any other suitable manner and/or based on any other suitable information.

In a first variant of S251, AP labels are determined based on characteristics of the devices connected to the AP (e.g., associated with the AP under an 802.11 communication standard), such as device type, quantity, and/or behavior. Connected devices can include, for example, currently connected devices, previously connected devices, and/or devices expected to connect in the future. Connected device characteristics can include characteristics indicative of device type, such as device identifiers (e.g., MAC address, OUI, Bluetooth device name, etc.), device transmission signal behavior (e.g., mobile or stationary position; connection timing such as always connected, regular connect/disconnect cycles, sporadic connection times; etc.), and/or device-associated network traffic characteristics (e.g., endpoints, data formats, etc.). For example, an AP that has an Xbox One (e.g., identified based on OUI, communication with Xbox Live servers, etc.) and smart television connected to it may be automatically labeled as a 'living room' AP, an AP that has a desktop computer (e.g., identified based on OUI, substantially stationary position, HTTP User-Agent string, etc.) connected to it may be automatically labeled as an 'office' AP, and/or an AP to which a smart phone remains connected throughout most nights, but which the smart phone is rarely connected to during weekdays, may be automatically labeled as a 'bedroom' AP (optionally, more specifically as the bedroom associated with the phone and/or the phone's primary user). In this example, data indicative of the phone-AP relationship can optionally be stored (e.g., wherein the phone is denoted as a 'priority' client of the 'bedroom' AP) and/or otherwise used (e.g., wherein the 'bedroom' AP QoS rules are altered to prioritize the phone over other client devices).

In a second variant, AP labels are determined based on characteristics of the communication data content. Content characteristics can include text content (e.g., analyzed using natural language processing techniques, keyword analysis, etc.), data formats, endpoints (e.g., WAN endpoints, such as websites), and/or any other suitable content-related aspects. For example, an AP that sees a lot of recipe queries on Google and/or frequent connections to cooking related websites might be labeled as a 'kitchen' AP.

AP labels can additionally or alternatively be determined (or previous determinations can be confirmed, refined, and/or revised) based on structure (e.g., building) layout information, optionally in combination with relative and/or absolute position information (e.g., determined as described below). Structure layout information can be determined based on sensor information, preferably networked device sensor information (e.g., images captured by security cameras connected to the LAN); user-provided information (e.g., architectural plans, photos, room labels, etc.); information stored by the router management platform; information from publically available sources (e.g., received from a website or internet server database) such as architectural plans, real estate listings (e.g., listing photos, MLS metadata, etc.), satellite and/or street view images (e.g., from a mapping service such as Google Maps); and/or any other suitable information.

Determining structure layout information based on sensor information can include determining relative locations of APs and appliances (e.g., networked appliances) such as lights and security cameras, preferably based on data sampled by the security cameras. For example, S251 can include determining an AP position based on image data (e.g., including an image of the AP) captured by a security camera. The AP position can be determined based on object recognition and image spatial analysis, determined based on a temporal sequence emitted by a light emitter of the AP, and/or determined in any other suitable manner. Based on the image data, the AP position can be determined relative to the security camera capturing the image, relative to other features represented in the image data, and/or relative to any other suitable features.

S251 can additionally or alternatively include determining physical location types based on the image data (e.g., based on object recognition), preferably associating the determined location types with devices (e.g., APs, the camera itself, other appliances such as thermostats, etc.) near the camera. For example, a security camera that captures an image including an oven can be labeled as a 'kitchen' camera, and a security camera that captures an image of a bed can be labeled as a 'bedroom' camera. The image data can additionally or alternatively be captured using a mobile device (e.g., smart phone running a router configuration client), wherein the determined location types can be associated with one or more static devices near the mobile device at the time of image capture (e.g., the AP connected to the mobile device).

As another example, APs may be labeled based on positioning data (e.g., GPS data, local positioning system data, hybrid positioning system data, etc.), such as based on GPS data collected by a GPS receiver of the AP (or alternatively, by a mobile electronic device near the AP).

S251 can optionally include determining relative AP locations. AP locations can be determined relative to other devices (e.g., such as computers, appliances, lights, security cameras, etc.), preferably devices with substantially static locations, relative to structural features (e.g., walls, doors, windows, ceilings, floors, etc.), and/or relative to any other suitable features.

S251 can optionally include receiving feedback (e.g., from a user, such as via a router configuration application) regarding automatically determined AP labels (e.g., and altering the AP labels based on the feedback). The feedback can include label confirmations and/or rejections (e.g., user agreement that a label is correct, user indication that a label is incorrect), label selections (e.g., wherein a user selects a preferred label from a plurality of proposed labels, such as the three most likely labels, or all labels above a target confidence threshold), label corrections and/or refinements (e.g., wherein a user edits a label and/or provides additional information for labeling), and/or any other suitable feedback regarding automatically determined labels (and/or regarding labels determined in any other suitable manner). In a first example, S251 includes requesting feedback in response to automatically determining a label. In a second example, S251 includes presenting (e.g., in a router configuration application) automatically determined labels for user feedback (e.g., in response to a user opening the router configuration application). However, the feedback can be received in any other suitable manner.

For localization techniques that utilize data corresponding to multiple APs, S250 preferably also includes determining the relative locations of the APs (to each other). S250 may determine this relative location data in any manner. For example, absolute locations (e.g., GPS locations, hybrid positioning system locations, etc.) of the APs may be used for this purpose.

Figure 5:
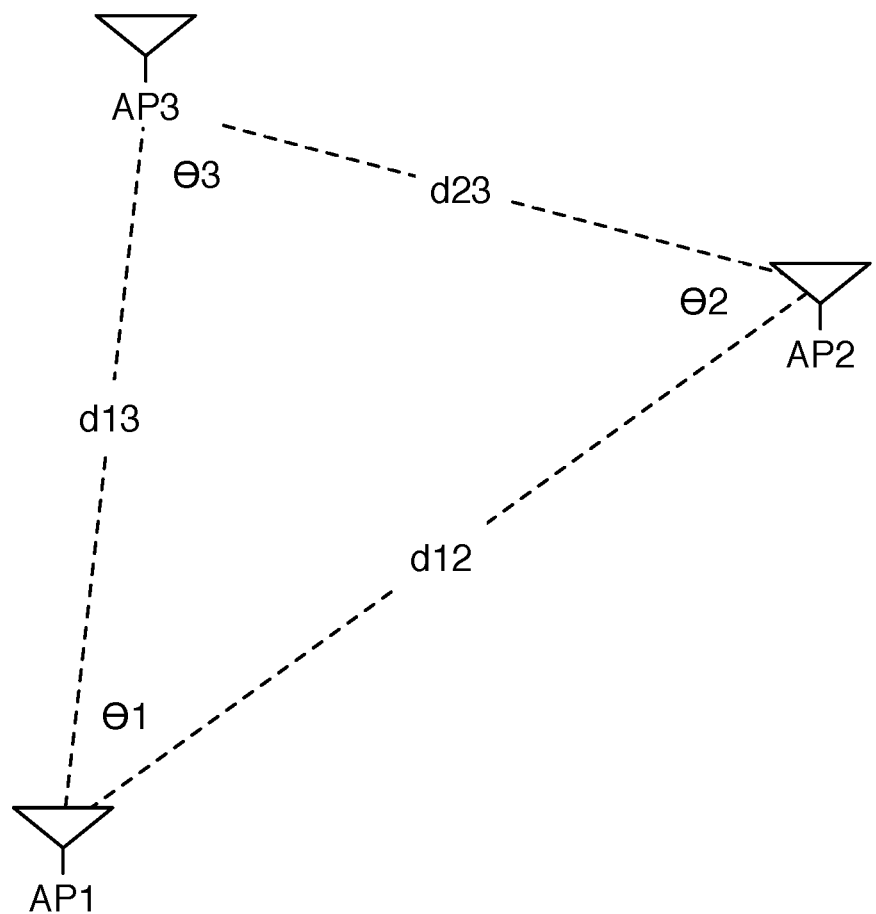
FIG. 5 is an example representation of router localization using distance estimation techniques.

As a second example, S250 may include collecting distance-related data (e.g., distance estimate data) from multiple APs over time and using this to compute the relative location of APs. For example, an AP may collect RSSI measurements for AP beacon signals from other APs. From these measurements, the AP may be able to estimate the distances between the AP and the other APs. If this process is repeated for three or more APs, the relative positioning of the APs may be determined. For example, RSSI can be used to determine a distance between AP1 and AP2 ($d_{12}$), a distance between AP1 and AP3 ($d_{13}$), and a distance between AP2 and AP3 ($d_{23}$). Given these three distances, the relative positioning of APs can be determined by calculating the angles between lines connecting the APs; for example, as shown in FIG. 5:

$$d_{12}^2 = d_{13}^2 + d_{23}^2 - 2d_{13}d_{23}\cos\theta_3$$

$$\frac{d_{23}}{\sin\theta_1} = \frac{d_{13}}{\sin\theta_2} = \frac{d_{12}}{\sin\theta_3}$$

can be used to determine the angles between any 3 APs. This technique may be extended for more than 3 APs. Additionally or alternatively, this technique can be extended to use orientation-related data, such as angle of arrival (e.g., from AoA measurements collected along with the RSSI measurements), in addition to or in place of distance-related data.

Alternatively, this data may be collected by a mobile electronic device. For example, the device may collect RSSI measurements for AP beacon signals. When the RSSI for a first AP is near a maximum, the RSSIs from other APs may be used to estimate distance from the first AP to the other APs.

S250 can optionally include detecting potentially erroneous and/or fraudulent device behavior. In one variant, S250 can include determining multiple different (e.g., conflicting) sets of location information associated with a single device identifier (e.g., MAC address), and determining that the location information may be indicative of fraudulent behavior. For example, if the location information indicates that a (purported) single device's location is rapidly switching between two regions (e.g., faster than the device could reasonably travel between the regions; in a manner inconsistent with typical device behavior, such as wherein its position within each region is observed to remain substantially stationary or to change slowly; etc.), S250 can include determining that the location information is actually associated with two different devices (e.g., each located in one of the two regions) and that one of the devices may be fraudulently acting as if it were the other device (e.g., performing MAC address spoofing). In a first specific example, two different APs (e.g., APs of the same LAN), such as APs with non-overlapping wireless coverage areas, are concurrently connected to (e.g., and actively communicating with) devices with identical identifiers (e.g., MAC addresses), indicating that each AP is actually connected to a different device (e.g., one device having spoofed the MAC address of the other device). In a second specific example, an AP observes rapid changes in connection metrics (e.g., RSSI, AoA, etc.) associated with a single device identifier, indicating that two devices using the identifier are concurrently connected to the AP.

This example can optionally further include determining which device is likely to be genuine and which is likely to be fraudulent (e.g., based on the communication data and/or location data). In a first specific example, the determination is made based on the device locations, preferably along with the associated location types (e.g., a device inside a room of the house is less likely to be fraudulent than a device at the street in front of the house). In a second specific example, the determination is made based on device communication data such as content and/or endpoints (e.g., a device whose communication behavior closely matches historical data associated with the device is less likely to be fraudulent than a device exhibiting novel behavior). In a third specific example, the determination is made based on device authentication (e.g., mediated by a management application running on the device, wherein the genuine device and the APs are associated with the same user account). A fourth specific example includes requesting user input (e.g., provided at an alternate device known to be genuine, provided at the router, provided in association with a user authentication, etc.), such as an input specifying the genuine device, wherein the determination is made based on the input. A fifth specific example includes restricting network access for both devices (e.g., disconnecting both devices from the network; restricting network communications for both device, such as only allowing communication with the APs; etc.) and collecting communication data after imposing the restrictions, wherein the determination is made based on the post-restriction communication data. In response to determining that a device is fraudulent, the method preferably includes disconnecting from the fraudulent device and preventing it from reconnecting to the network. However, erroneous and/or fraudulent device behavior can additionally or alternatively be detected and/or mitigated in any other suitable manner.

S250 can additionally or alternatively include determining device location in any other suitable manner.

S260 includes controlling one or more devices, preferably based on the device location (e.g., determined in S250). S260 preferably functions to enable performance of location-based tasks.

S260 is preferably performed in response to receiving the device location query S210 and/or determining the device location S250, but can additionally or alternatively be performed in response to determining occurrence of a trigger (e.g., location-related trigger such as device movement; connection-related trigger such as device connection, disconnection, and/or connection change; network traffic content-related trigger; user preference-related trigger; etc.) and/or at any other suitable time. S260 can be performed once, continuously, periodically, sporadically, and/or with any other suitable timing.

The set of devices controlled in S260 preferably includes networked electronic devices (e.g., connected to a network or network device, such as: the LAN, a device of the LAN such as a router, the router management platform, a WAN such as the internet, etc.), but can additionally or alternatively include non-networked electronic devices, non-electronic devices, and/or any other suitable devices. The devices are preferably controlled via electronic communications such as network communications (e.g., using a wireless communication protocol such as Wi-Fi, Bluetooth, Thread, cellular network communications, etc.; using a wired communication protocol such as Ethernet, USB, etc.), but can additionally or alternatively be controlled in any other suitable manner.

The devices can include routers (e.g., one or more routers of the LAN, routers of other networks, etc.), electronic user devices (e.g., smart phone, smart watch, computing device, etc.), appliances (e.g., networked home appliances), vehicles, and/or any other suitable devices. Appliances can include physical environment controllers (e.g., lighting devices, audio speakers, image/video displays, climate control devices such as thermostats, access control devices such as door locks, etc.), security devices (e.g., motion detectors, cameras, communication modules configured to communicate with security-related endpoints such as emergency dispatch centers and/or private security providers, etc.), cleaning appliances (e.g., clothes washer and/or dryer, dishwasher, robotic vacuum, etc.), cooking appliances, water heaters, and/or any other suitable appliances.

Figure 6:
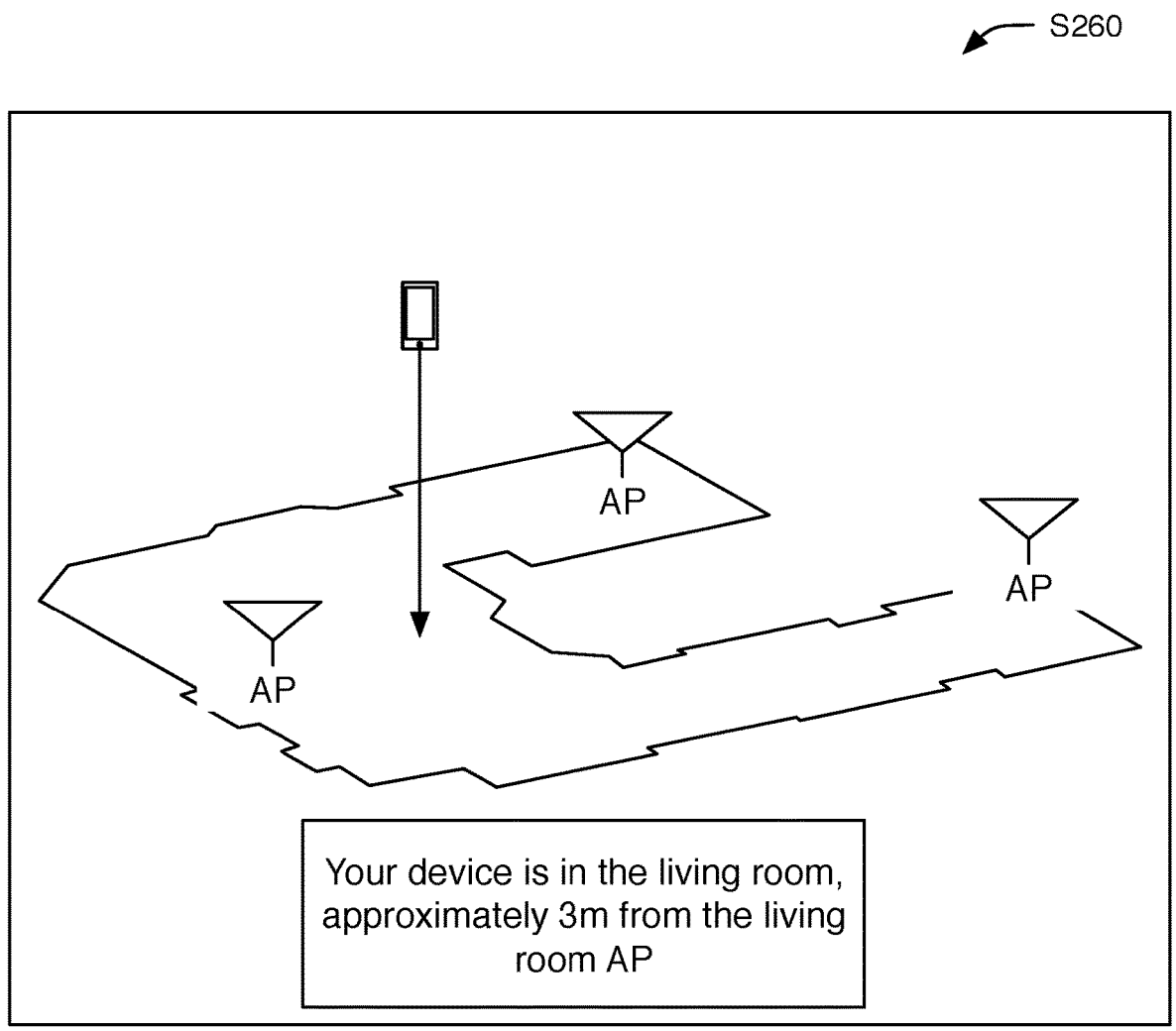
FIG. 6 is an example representation of a device locating interface.

In a first embodiment, S260 includes providing location feedback (e.g., to a user, to the router management platform, etc.), preferably by controlling one or more devices to provide the location feedback. Location feedback can be provided in any manner. For example, S260 may provide a graphic illustrating the relative positions of APs and the device, such as shown in FIG. 6 (e.g., by controlling a device, such as the user device from which a location query was received in S210, to provide the graphic). As second example, S260 may provide a text-based description of location to the user. This description may be provided in any manner; for example, if device location request originated from a voice-controlled assistant, the location feedback may be provided (e.g., via an API) to the voice-controlled assistant: "User, Paul's iPhone was last seen approximately ten feet from the bedroom access point ten minutes ago". S260 may include providing any data relevant to device location, including last-seen-time, location data, heading data, predicted location/path, and/or any other data useful for locating the device.

In a second embodiment, S260 includes altering operation of one or more appliances. Altering appliance operation (e.g., controlling the appliance to operate in a different operational mode) can include switching between mutually-exclusive modes (e.g., turning an appliance on or off, locking or unlocking a lock, etc.), adjusting operation parameters (e.g., intensity, timing, control setpoint, color, song, etc.), and/or any other suitable changes. A first example of this embodiment includes adjusting a temperature setpoint of a thermostat based on user presence and/or preferences (e.g., when a device associated with a user enters a room, adjust the setpoint based on the user's temperature preferences; based on a prediction that a user will soon move to a bedroom, begin heating the bedroom). A second example includes adjusting appliance operation based on device paths (e.g., observed path, predicted path, etc.). In a specific example, in response to predicting that a device is moving (or will soon move) from a bedroom to the kitchen, S260 can include controlling appliances (e.g., lights and audio speakers) in the kitchen and along the path from the bedroom to the kitchen (e.g., to match operation of similar appliances in the bedroom, such as by providing illumination and/or playing the same music as is being played in the bedroom). However, the appliances can additionally or alternatively be controlled in any other suitable way.

In a third embodiment, S260 includes controlling (e.g., altering operation of) one or more routers (and/or other network devices). Altering router operation can include altering network access configurations, network interaction configurations (e.g., router configurations that affect interaction with the network by: the user, other authorized users, network devices, etc.), data logging configurations (e.g., enabling or disabling logging of network data associated with a device, such as website visits, data usage, network activity times, etc.), radio configurations (e.g., transmission power, beamforming parameters, channels to use, radios to use, etc.), and/or any other suitable configurations.

In a first example of this embodiment, the routers are configured to only allow devices inside a structure (e.g., home) to connect to the network (e.g., by adding the devices to a MAC address whitelist in response to determining that they have entered the home and removing them in response to determining that they have left the home). In a second example, a first set of content filtering rules are imposed on a child's device unless a parent's phone is near the child's device (e.g., changing to a second set of rules in response to determining the phone-child's device proximity, removing the restrictions entirely during phone-child's device proximity, etc.). In a third example, the routers are configured to prevent access to the network by devices acting fraudulently (e.g., determined as described above regarding S250), and a user device is controlled to present a notification about the fraudulent behavior.

In a fourth example, the network is being used to provide a first video stream to a living room TV and a second video stream to a tablet located in a bedroom. In this example, three smart phones are detected on a couch in the living room, and only one is detected in the bedroom (e.g., possibly indicating that more users are viewing the first video stream than the second). Based on this determination, network QoS rules are configured to prioritize delivery of the first video stream above delivery of the second video stream.

In a fifth example, one or more devices can be given preferential (and/or disadvantageous) treatment based on their relationship with one or more APs (e.g., relationship determined in S251, such as a 'priority' device of an AP). For example, devices that typically (e.g., determined based on historical data) use an AP associated with a private room type (e.g., bedroom, rather than kitchen or living room) can be prioritized (e.g., through QoS rules) over other devices using that AP (but not necessarily prioritized when connected to other APs).

Figure 9A:
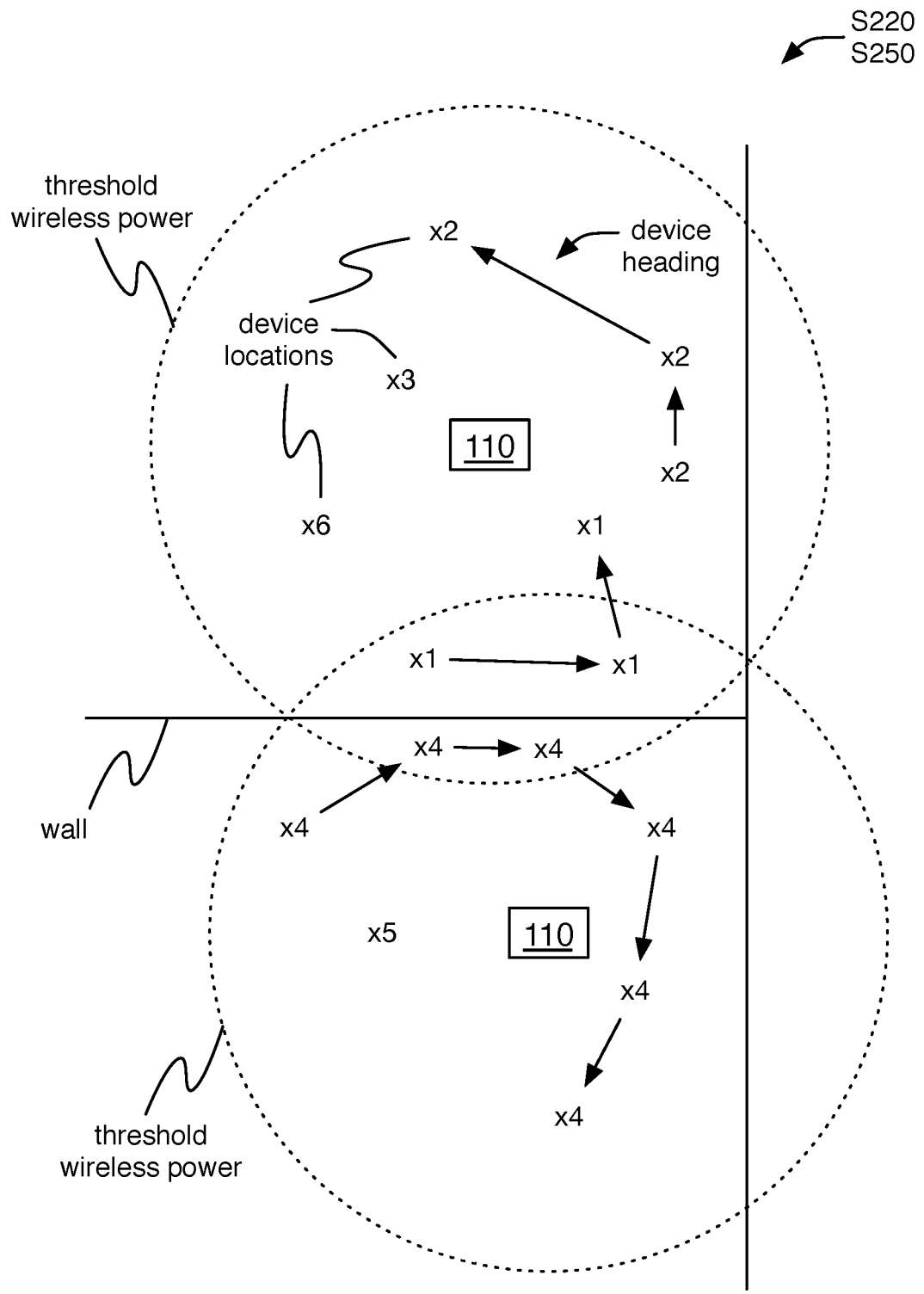
FIGS. 9A-9C are a schematic representation of a third example of the method.
Figure 9B:
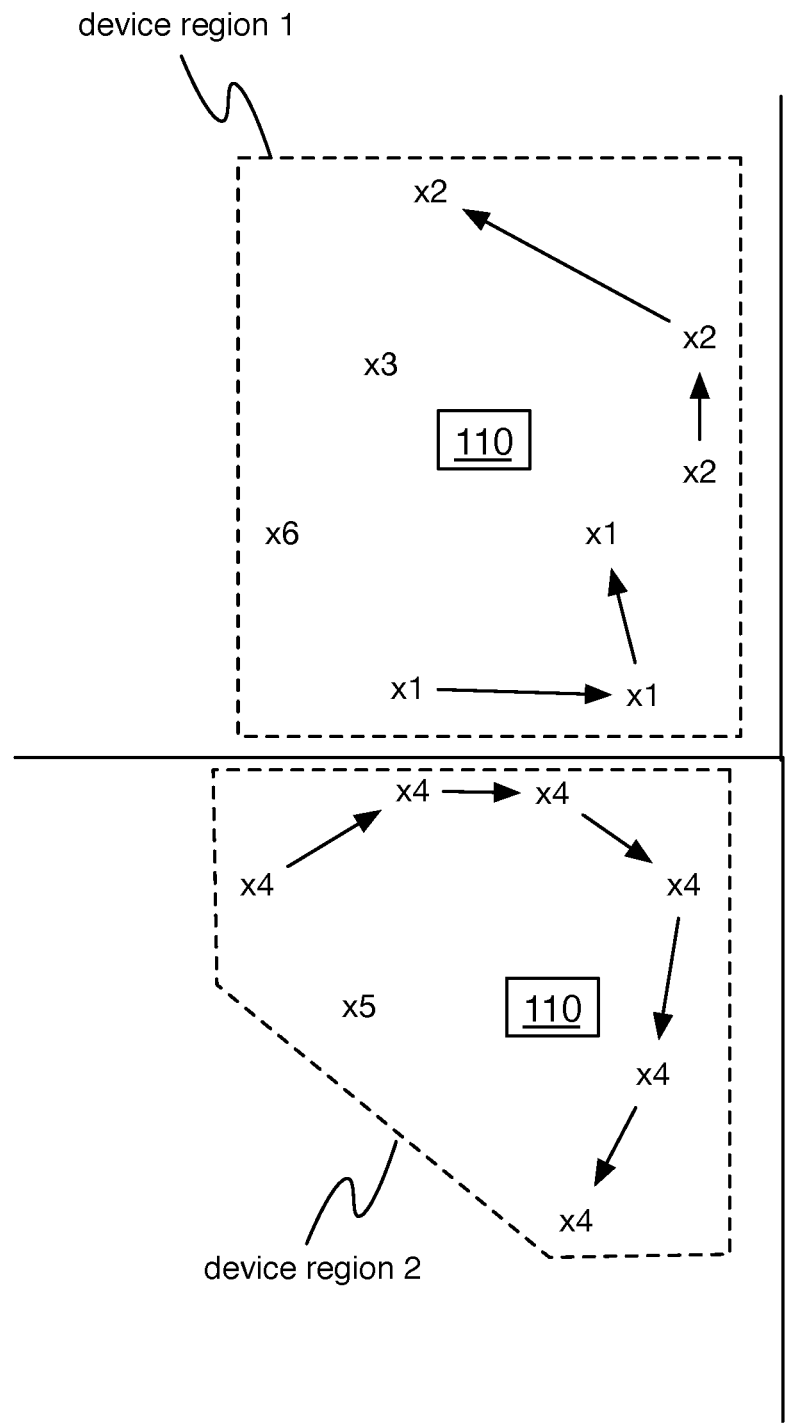
Figure 9C:
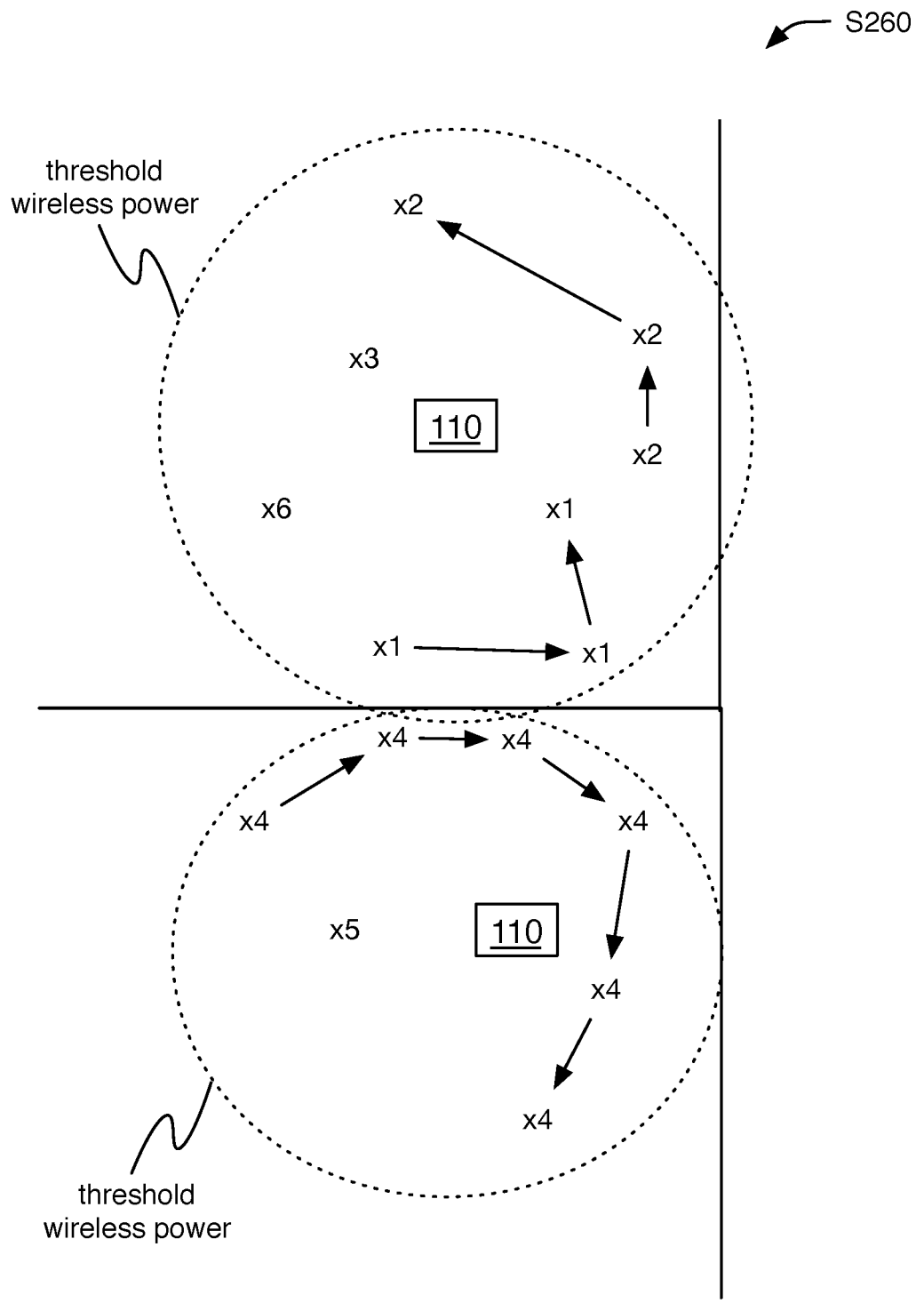

In a sixth example, device location data (e.g., determined based on connection metrics, such as power level metrics and/or AoA) and/or other suitable information, (e.g., structural layout information, camera images, etc.) indicates regions in which electronic devices tend to communicate with the APs (e.g., as shown in FIG. 9B). The regions are preferably distinct regions of electronic device usage (e.g., wherein most electronic devices do not frequently move back and forth between the regions), but can additionally or alternatively include any other suitable device location regions. The regions are preferably determined such that electronic devices tend to remain within a single region for a significant time (e.g., greater than 1 hr, 10 min, 1 min, etc.). The regions can additionally or alternatively be determined based on physical boundaries (e.g., room walls, fences, etc.) and/or any other suitable information. In this example, S260 preferably includes setting transmission configurations of one or more APs based on the determined regions (e.g., as shown in FIG. 9C). The transmission configurations are preferably determined in order to maximize each AP's wireless coverage of one or more regions (e.g., regions in which the AP is located, regions near the AP, regions with devices best served by the AP, etc.) and to minimize its interference in other regions (e.g., all other regions, a subset of the regions). For example, an AP can be associated with a region, and its transmission configuration can be set in order to avoid significant transmission into the other regions, while still maintaining good wireless coverage of its own region. Transmission configuration changes can include increased or reduced AP transmission power (e.g., average power, maximum power, etc.), altered beamforming parameters such as transmission phases and/or intensities of elements of a phased array (e.g., to direct transmission toward and/or away from regions, to direct transmission toward and/or away from specific electronic devices, etc.), radio frequency changes (e.g., switching from a 2.4 GHz radio to a 5 GHz radio, such as to increase signal attenuation by walls), and/or any other suitable configuration changes. Such transmission configuration changes can function to, for example, reduce interference between the APs (and/or the other electronic devices), prevent the need for client devices (e.g., mobile client devices) to frequently switch between connections to different APs (e.g., such as might occur for devices such as x1 and x4 in FIG. 9A), and/or otherwise improve functioning of the wireless network. This example can optionally include repeatedly (e.g., continuously, periodically, in response to a trigger event, etc.) re-determining the regions and modifying transmission parameters based on the new regions.

In a specific example of the fifth example, two (or more) routers are each configured to transmit (e.g., for wireless communication) into overlapping volumes (e.g., as shown in FIG. 9A), wherein, at some locations within the overlapping volumes, the wireless power generated by each router is greater than a threshold power (e.g., power threshold above which wireless stations detecting the transmission will wait before sending transmissions, such as a threshold defined in IEEE 802.11; power threshold associated with performant wireless communication; a percentage thereof, such as 50%, 75%, 85%, 90%, 95%, 105%, 110%, 120%, 150%, 200%, etc.; etc.). Based on characteristics of wireless transmissions (e.g., sent by and/or received at one or more of the routers and/or other electronic devices, preferably transmissions from the other devices to the routers), electronic device locations and/or headings (e.g., time series of locations, historical location distributions, etc.) are determined (e.g., at the routers, at a remote management platform, etc.). Based on the locations and/or headings, electronic device regions (e.g., disjoint regions, such as shown in FIG. 9B; overlapping regions; etc.) are determined (e.g., at the routers, at a remote management platform, etc.). One or more of the APs are then reconfigured based on the regions. For example, the transmission power of one AP (e.g., within, near, and/or otherwise associate with the first region) can be reduced, and the second AP (e.g., within, near, and/or otherwise associate with the second region) can use beamforming controls to bias its transmissions away from the first region (e.g., as shown in FIG. 9C).

Network access configurations can include authentication configurations (e.g., Wi-Fi SSID and associated credential, such as a: PSK, certificate, public key of a cryptographic key pair, hardware security key such as a U2F device, etc.), device lists (e.g., MAC address whitelist or blacklist), and/or any other suitable network access information. Network interaction configurations can include a security policy configuration (e.g., a firewall configuration), preferably to maintain network security; content filtering configuration (e.g., website whitelist, protocol blacklist, etc.), preferably to impose parental, workplace, and/or legal controls; quality of service (QoS) configuration, preferably to ensure network performance; a LAN configuration; WAN configuration (e.g., router WAN IP address); NAT configuration (e.g., port forwarding settings); and/or DNS configuration. The LAN configuration can include a DHCP configuration, VLAN configuration, LAN topology, and/or any other suitable LAN configuration information. However, S260 can additionally or alternatively include altering any other suitable router configurations and/or altering router operation in any other suitable manner.

As previously discussed, S260 preferably controls the devices (e.g., provides location data, changes operational modes, etc.) according to the permissions a user may have (e.g., to obtain such data, effect such changes, etc.). For example, a user may receive detailed location of a device if the device is within a user's network (e.g., 'Ten feet from the bedroom AP') while the same user may receive less detailed location data for a device last seen in a friend's network (e.g., 'the device was last seen at Tom's House').

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method comprising:
    at a first router of a local area network (LAN), collecting a first set of LAN communication data, wherein the first set of LAN communication data comprises first characteristics of devices previously or currently connected to the first router or communications by devices in proximity to the first router;
    at a second router of the LAN, collecting a second set of LAN communication data, wherein the second set of LAN communication data comprises second characteristics of devices previously or currently connected to the second router or communications by devices in proximity to the second router;
    determining a first location type of the first router, wherein the determining the first location type of the first router comprises automatically classifying the first set of LAN communication data as associated with the first location type using the first characteristics, the first location type corresponding to a first area associated with a first physical location of the first router;
    determining a second location type of the second router, wherein determining the second location type comprises automatically classifying the second set of LAN communication data as associated with the second location type using the second characteristics, the second location type corresponding to a second area associated with a second physical location of the second router, wherein the first and second location types are different;
    at the first router, receiving a wireless transmission from an electronic device; and
    determining a device location of the electronic device relative to the first router using the first location type of the first router, wherein the device location is in a vicinity of the first area associated with the first physical location of the first router; and
    outputting location information comprising the device location and the first location type.

2. The method of claim 1, further comprising: determining a connection metric associated with the electronic device and the first router, wherein determining the device location comprises estimating a distance between the electronic device and the first router using the connection metric, wherein the location information specifies the distance between the electronic device and the first router.

3. The method of claim 2, wherein the connection metric comprises a received signal strength indicator of the wireless transmission.

4. The method of claim 2, further comprising:
at the second router, receiving a second wireless transmission from the electronic device; and
determining a second connection metric associated with the electronic device and the second router, wherein determining the device location comprises:
estimating a distance between the electronic device and the second router using the second connection metric; and
determining a position of the electronic device using the distance between the electronic device and the first router and the distance between the electronic device and the second router, wherein the location information specifies the position of the electronic device.

5. The method of claim 4, wherein the second wireless transmission comprises a unicast transmission to the first router.

6. The method of claim 4, further comprising, before receiving the second wireless transmission:
forcing the electronic device to disconnect from the first router; and
after forcing the electronic device to disconnect from the first router, preventing the electronic device from reconnecting to the first router.

7. The method of claim 4, wherein determining the position of the electronic device comprises performing a bilateration process using the connection metric and the second connection metric.

8. The method of claim 1, further comprising controlling a second electronic device to output a message indicative of the device location and the first location type.

9. The method of claim 1, further comprising controlling a physical environment controller to change operation from a first mode to a second mode responsive to the location information.

10. The method of claim 1, wherein:
the first set of LAN communication data comprises a media access control (MAC) address associated with a device that is previously or currently connected to the first router or in proximity to the first router, wherein the MAC address is not a first router MAC address of the first router; and
determining the first location type is performed based on an organizationally unique identifier (OUI) of the MAC address.

11. The method of claim 1, wherein:
collecting the first set of LAN communication data comprises, at the first router, receiving the first set of LAN communication data via a communication protocol;
collecting the second set of LAN communication data comprises, at the second router, receiving the second set of LAN communication data via the communication protocol;
the first location type is indicative of proximity to a first room of a first room type;
the second location type is indicative of proximity to a second room of a second room type different from the first room type;
determining the first location type comprises classifying the first set of LAN communication data as associated with the first room type; and
determining the second location type comprises classifying the second set of LAN communication data as associated with the second room type.

12. The method of claim 11, wherein the communication protocol is Wi-Fi protocol.

13. The method of claim 1, wherein:
the first location type is indicative of proximity to a first room of a first room type;
the second location type is indicative of proximity to a second room of a second room type different from the first room type;
determining the first location type comprises classifying the first set of LAN communication data as associated with the first room type;
determining the second location type comprises classifying the second set of LAN communication data as associated with the second room type; and
the first room type is a kitchen.

14. The method of claim 13, wherein:
the first set of LAN communication data comprises content associated with cooking; and
classifying the first router as associated with the first location type comprises, based on the association of the content with cooking, classifying the first router as associated with a kitchen.

15. The method of claim 1, further comprising transmitting the first and second sets of LAN communication data to a remote router management platform, wherein determining the first and second location types is performed by the remote router management platform.

16. The method of claim 1, wherein the first location type does not specify a geographical position of the first router.

17. A method comprising:
at a first router of a LAN, collecting a first set of LAN communication data, comprising, at the first router, receiving a first transmission from a first device, the first transmission comprising content indicative of a first location type;
at a second router of the LAN, collecting a second set of LAN communication data;
determining a first location type of the first router, wherein determining the first location type comprises classifying the first router as associated with the first location type using the content of the first transmission;
determining a second location type of the second router using the second set of LAN communication data, wherein the first and second location types are different;
at the first router, receiving a wireless transmission from a second device;
determining a device location of the second device relative to the first router using the first location type of the first router, wherein the device location is in a vicinity of a first area associated with a first physical location of the first router; and
outputting location information comprising the device location and the first location type.

18. The method of claim 17, wherein:
the content comprises a MAC address of the first device; and
classifying the first device as associated with the first location type comprises determining a device type of the first device using an organizationally unique identifier (OUI) of the MAC address, wherein the device type is associated with the first location type.

19. The method of claim 17, wherein:

the content is associated with cooking;

the first location type is associated with a kitchen; and classifying the first router as associated with the first location type comprises, classifying the first router as associated with the kitchen using the association of the content with cooking.

* * * * *